United States Patent [19]

Klein

[11] Patent Number: 5,363,343

[45] Date of Patent: Nov. 8, 1994

[54] FOLDED HYDROPHONE ARRAY FOR NARROW MARINE VEHICLES

[75] Inventor: Jerry G. Klein, Bellerose, N.Y.

[73] Assignee: Unisys Corporation, Blue Bell, Pa.

[21] Appl. No.: 162,930

[22] Filed: Dec. 8, 1993

[51] Int. Cl.⁵ .......................................... H04R 17/00
[52] U.S. Cl. ................................. 367/154; 367/165; 367/173; 367/129; 114/21.3
[58] Field of Search ............... 367/106, 130, 153, 154, 367/165, 173, 88, 129, 3, 4, 5; 114/21.3

[56] References Cited

U.S. PATENT DOCUMENTS

| 4,992,999 | 2/1991 | Yerby et al. ............... | 367/130 |
| 5,022,012 | 6/1991 | Godfrey et al. ............ | 367/3 |
| 5,197,036 | 3/1993 | Buckingham ............... | 367/4 |

Primary Examiner—J. Woodrow Eldred
Attorney, Agent, or Firm—Albert B. Cooper; Mark T. Starr

[57] ABSTRACT

An extendible linear sonar array for an Autonomous Underwater Vehicle (AUV) comprises a linear hydrophone array fixed in the nose of the AUV and two hydrophone array segments mounted at the leading edge of stabilization fins extendible from and retractable into the AUV. The stabilization fins are pivoted to move between extended and retracted positions where, in the extended position, the movable arrays together with the fixed nose array form a linear sonar array with extended width. In the retracted position, the stabilization fins with the hydrophone arrays pivot and fold back into stow channels in the AUV body. The stabilization fins may include movable control surfaces to control the attitude of the AUV, or the stabilization fins can be rotated when in the extended position to provide attitude control.

7 Claims, 4 Drawing Sheets

FOLDED HYDROPHONE ARRAY FOR NARROW MARINE VEHICLES

BACKGROUND OF THE INVENTION

1. Field of the Invention

The invention relates to sonar particularly with respect to linear hydrophone arrays for use in narrow underwater vehicles. The term "hydrophone array" is construed to include hydrophone/projector arrays.

2. Description of the Prior Art

Underwater vehicles generally utilize a forward-looking sonar for obstacle avoidance, mine detection, etc., a linear hydrophone array typically being mounted in the nose of the vehicle. Some of these vehicles tend to be small in diameter. A current evolutionary trend is toward Autonomous Underwater Vehicles (AUV) which can be launched from a submarine torpedo tube. Such an AUV is thus limited to a 21 inch diameter.

The imaging resolution achievable by the sonar is limited by the width of the linear array at a given sonar frequency. The wider the array, the better the resolution. Resolution can also be enhanced by utilizing higher sonar frequencies, but the higher the frequency, the lower the range capability of the sonar. Wide arrays can accommodate moderate resolution at a lower frequency, a lower frequency permitting greater range capability. Small vehicles, however, such as AUVs, are too small to accommodate wide arrays while stowed in their launch tubes or carrying fixtures.

For most underwater vehicles, design constraints limit the diameter of the vehicle body and, thus, the size of sonar hydrophone arrays contained within the body. For vehicles launched from a torpedo tube, the constraint is exacerbated. Because of these constraints, such vehicles have limited width hydrophone arrays resulting in poor resolution sonar data. Alternatively, the sonar design is limited to the use of relatively high frequencies which reduces sonar range capability.

The evolution in AUVs is toward reducing vehicle size to accommodate various methods for deployment; e.g., the 21 inch torpedo tube launchable vehicle class. However, reduction in overall vehicle size increases the need for greater vehicle autonomy resulting in a requirement for improved on-board sensors. As discussed above, however, improved resolution sonar sensors for a given sonar frequency tends to require a larger vehicle. The larger vehicle size requirement impedes the evolutionary trend toward smaller vehicles.

SUMMARY OF THE INVENTION

The above-described width constraint can be obviated by utilizing a folded hydrophone array contained within the envelope of the vessel but constructed to unfold into a wide linear array after launch or at a later time in the vehicle mission.

As a specific embodiment, the hydrophone array can be included on the leading edge of a folded stabilizer surface configuration which, when deployed, provides a wide hydrophone array and a wide hydrodynamic surface for vehicle stability.

A further embodiment of the invention includes a movable control surface on the folded stabilizer member for effecting steering and attitude control when the configuration is unfolded.

DESCRIPTION OF THE PREFERRED EMBODIMENTS

Figure 1A:
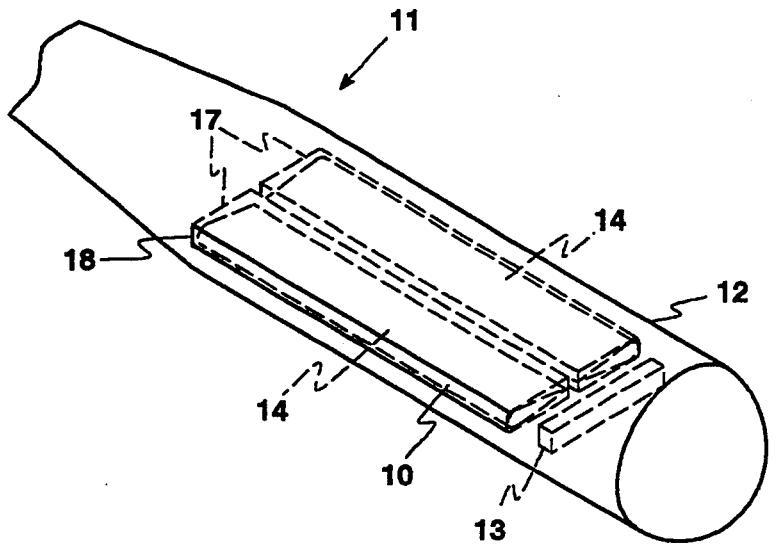
FIGS. 1A and 1B are three-dimensional views of an AUV with the hydrophone array illustrated folded and unfolded, respectively.
Figure 1B:
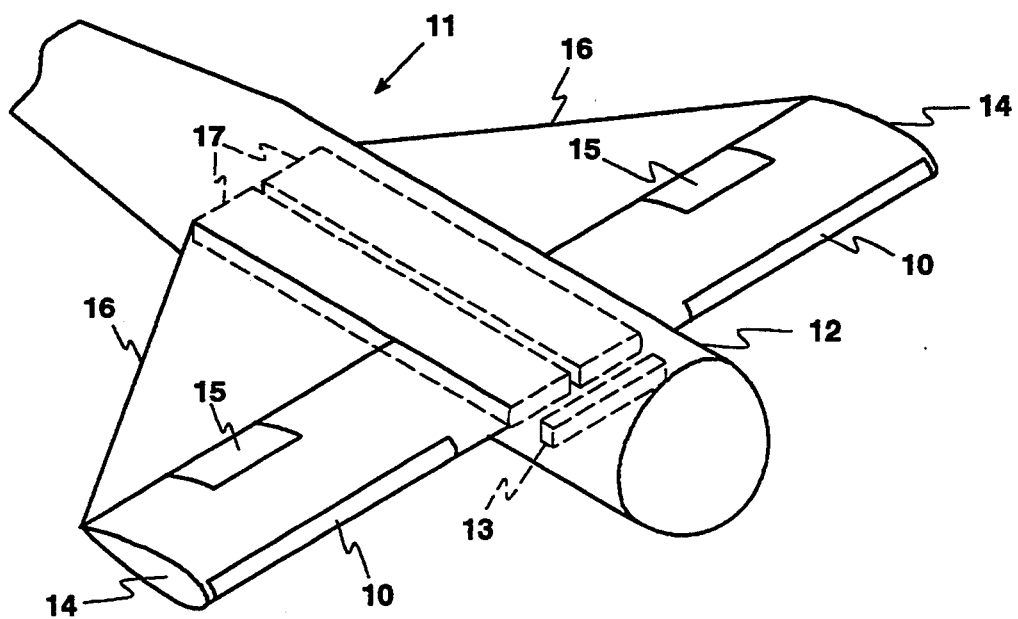

Referring to FIGS. 1A and 1B, a folded hydrophone array 10 is illustrated on a marine vehicle 11 such as an AUV. The AUV includes a vehicle body 12 typically comprised of a pressure hull. The AUV 11 includes a conventional fixed nose hydrophone array 13 that operates in conjunction with the array 10 when unfolded, as illustrated in FIG. 1B. The hydrophone array 10 is conveniently mounted on the leading edges of stabilizer fins 14 that fold into the body 12. The stabilizer fins 14 can additionally include positionable control surfaces 15 and, as a further arrangement, the fins 14 may be implemented as positionable control surfaces, in a manner to be described.

The fins 14 with the hydrophone array 10 are deployed and retracted by retraction cables 16 which can be reeled in or released by an internal motor or manual control (not shown). FIG. 1A illustrates the hydrophone array 10/stabilization fins 14 folded inside the vehicle body 12 within stow channels 17. FIG. 1B illustrates hydrophone array 10/stabilization fins 14 in the extended position. A spring loaded door 18 can be utilized, if required, to maintain hydrodynamic flow when the folded configuration is retracted. When the device is in the retracted position, the spring loaded door 18 can close to cover the opening in the vehicle envelope thus maintaining a smooth envelope for enhanced hydrodynamic characteristics.

Although in FIG. 1B, the hydrophone array 13 is illustrated forward of the arrays 10 for clarity, in practice the configuration should be arranged so that the arrays 10 and 13 are colinear.

Figure 2A:
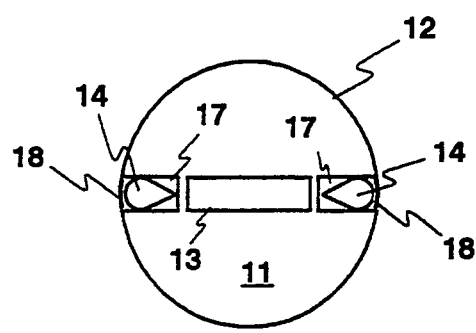
FIGS. 2A and 2B are front elevation views of the AUV of FIGS. 1A and 1B with the hydrophone array illustrated stowed and deployed, respectively.
Figure 2B:
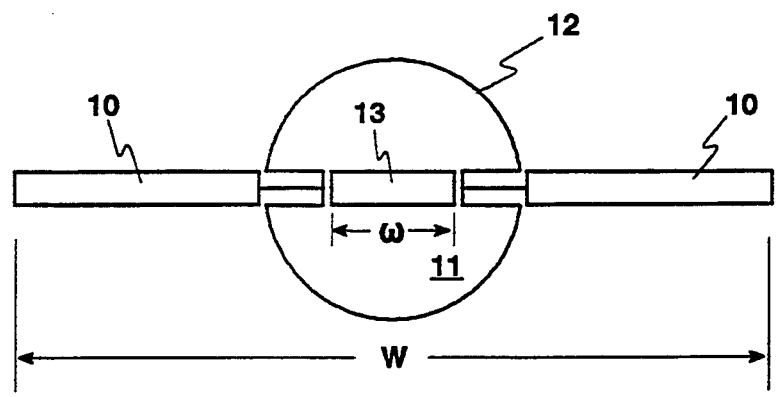
Figure 2C:
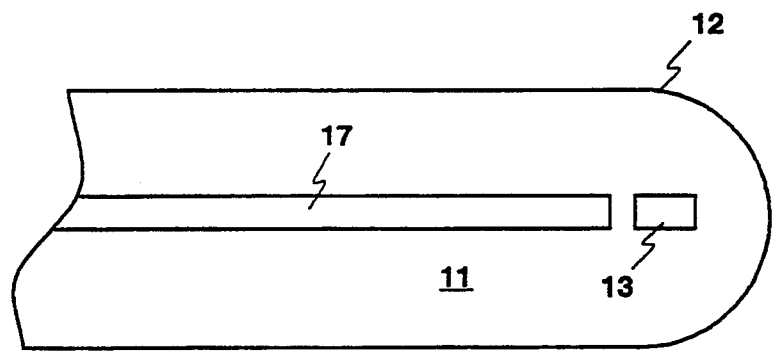
FIG. 2C is a side elevation view of the AUV of FIG. 1A.

Referring to FIGS. 2A, 2B and 2C, in which like reference numerals indicate like components with respect to FIGS. 1A and 1B, front and side elevation views of the present invention installed on an AUV are illustrated. FIGS. 2A and 2B are front elevation views showing the hydrophone array 10/stabilization fins 14 in the stowed and extended positions, respectively. FIG. 2C is a side elevation view thereof illustrating stow channel 17 and fixed nose hydrophone 13. FIG. 2A illustrates that the fixed nose hydrophone segment 13 can be used alone during folded operation. When the array is unfolded, as illustrated in FIG. 2B, the additional two hydrophone segments 10 are activated. It is seen in FIG. 2B that the conventional fixed nose hydrophone 13 has a width w and in the deployed position the hydrophone array has a significantly larger width W.

Thus, the hydrophone array segments 10 and 13, when in extended operation, form a linear hydrophone array of width W. During folded operation, the fixed nose hydrophone segment 13 is the portion of the array that is in use.

Figure 3:
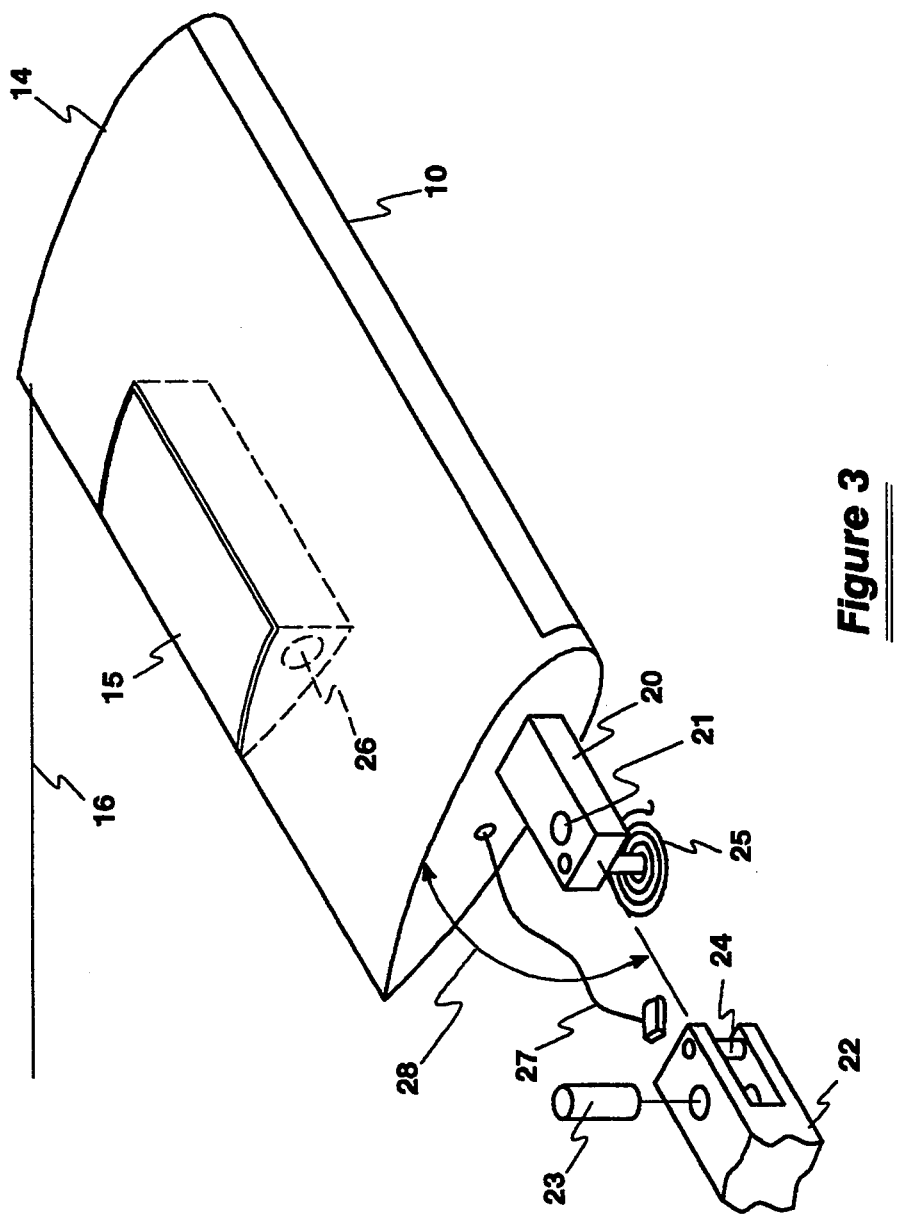
FIG. 3 is an exploded three-dimensional view illustrating constructional details of the hydrophone array/stabilizer surface/control surface embodiment of the present invention.

Referring to FIG. 3, in which like reference numerals indicate like components with respect to FIG. 1B, details of one embodiment of the invention are illustrated. The stabilizer fin 14 includes a lever arm 20 having a pivot aperture 21 therethrough. A foundation 22 fixed within the vehicle body 12 supports a pivot pin 23 and a stop pin 24 which together with the lever arm 20 and aperture 21 provides retraction and deployment of the stabilizer fin 14 with the hydrophone array 10.

An extender spring 25 deploys the array by providing a torque around pivot 23 when the retraction cable 16 is relaxed. The cable 16 extends into the vehicle body 12 where it is reeled in or released as required to retract and extend the array. A control surface actuator 26 positions the control surface 15. The hydrophone array 10 and control surface actuator 26 are linked to the vehicle 11 by appropriate electrical cables 27. An arrow 28 indicates the motion of the stabilizer fin 14 when moving from its stowed to its extended position.

As seen in FIG. 1B, the stabilizer fins 14, when extended, enhance hydrodynamic vehicle stability. The control surfaces 15 can be actuated in opposition with respect to each other to provide vehicle roll control in the manner of aircraft ailerons. The control surfaces 15 can also be actuated in the same direction to provide vehicle pitch control in the manner of an aircraft elevator.

Figure 4:
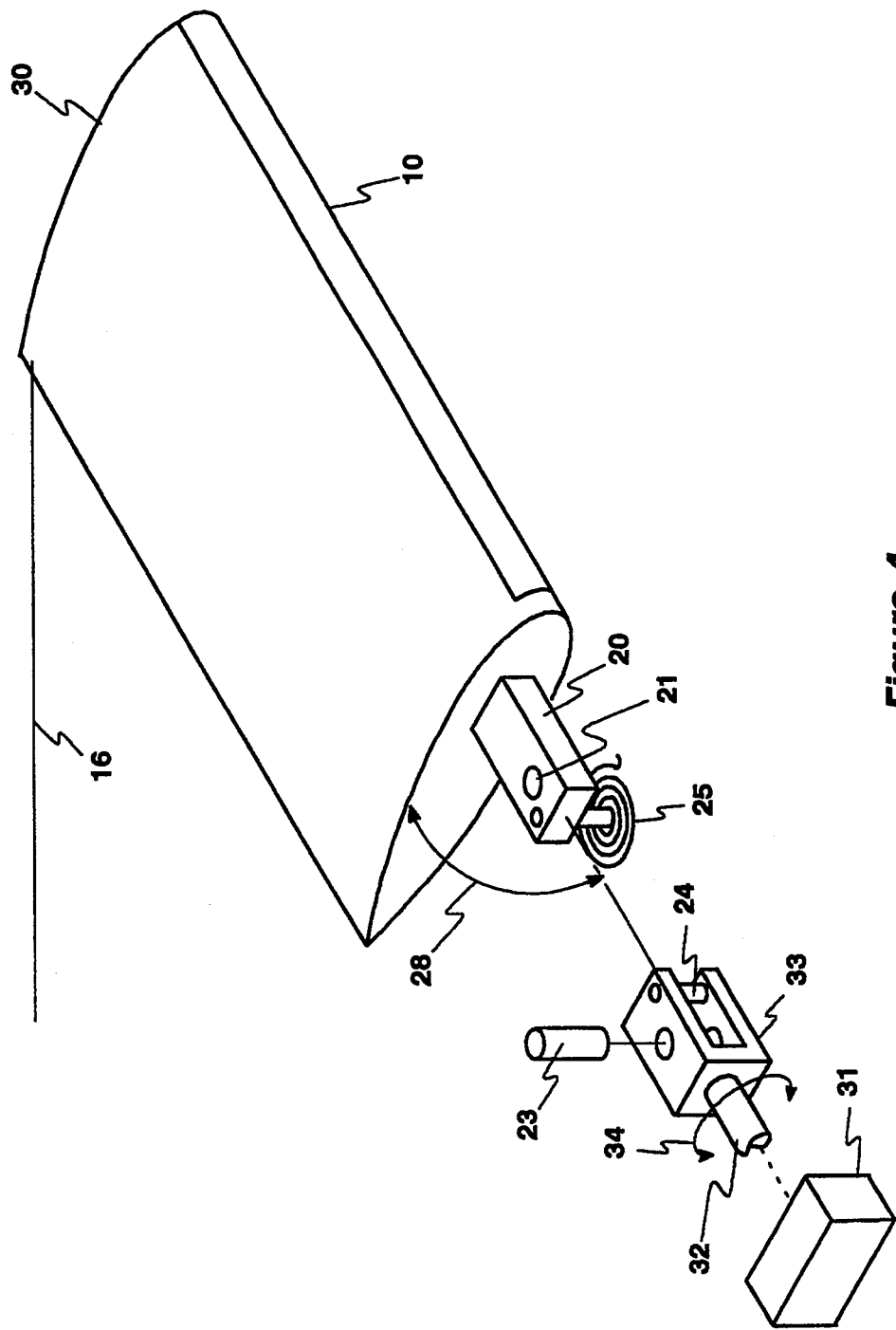
FIG. 4 is an exploded three-dimensional view illustrating constructional details of the hydrophone array/combination stabilizer-control surface embodiment of the present invention.

Referring to FIG. 4, in which like reference numerals indicate like components with respect to FIGS. 1B and 3, an alternative embodiment is illustrated wherein a combination stabilizer-control surface 30 is utilized instead of the fixed stabilizer fin 14 and positionable control surface 15 of FIG. 3. In this embodiment, components 16, 20, 21 and 23-25 operate in the manner described above with respect to these components in FIG. 3. In the FIG. 4 embodiment, the stabilizer-control surface member 30 is positioned by a control surface actuator 31 via a shaft 32 and a pivot support 33. The rotational motion imparted by the control surface actuator 31 to the member 30 is depicted by an arrow 34. The control surface actuator 31 is fixedly contained within the vehicle body 12.

In a manner similar to that described above with respect to FIG. 3, the members 30 provide hydrodynamic stability and can, in addition, be positioned in opposition or in the same direction to effect attitude control.

The invention overcomes the above described limitations of the prior art allowing sonar designers to achieve superior resolution and/or enhanced range and provides the vehicle mechanical designer more flexibility in the maneuvering system. The hydrophone array/control surface can be deployed and retracted as required during the mission. For example, the hydrophone array can be maintained folded while the vehicle is in transit at high speed and unfolded when the mission search area is reached. The device can thereafter be retracted on the return leg of the mission or before recovery of the vehicle.

Although extender spring 25 is illustrated as a mechanism for deploying the device, it is appreciated that other rigging configurations can be utilized such as hydraulic or electric extender mechanisms. When folded, the hydrophone array 10 is locked within the envelope of the vehicle 11 and is spring loaded or otherwise rigged to unfold after launch or at a later time in the mission.

The folded structure concept is also applicable to larger manned underwater vehicles, even those not launched from a torpedo tube. The device is also applicable to acoustic mines and acoustic homing torpedoes. These larger vehicles are still small enough to constrain the hydrophone width.

Although the above-described embodiments of the invention were explained in terms of pivoting the members 14 or 30 into an extended position, it is appreciated that other deployment mechanisms may be utilized within the scope of the invention, For example, compound translation linkages may be utilized whereby both fins 14 (or 30) linearly translate from the extended position rearwardly and then inwardly for storage in a lateral orientation within the vehicle. Such positioning mechanisms are well known and may be of the type utilized in opening and closing the rear doors of land utility vans.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A linear sonar hydrophone array extendible from a marine vehicle having a vehicle width, comprising:
   first and second linear hydrophone array segments, each having an array segment width, extendible from a retracted position within said vehicle to an extended position projecting from said vehicle to form an extended array having an array width at least equal to the sum of said segment widths, said array width being substantially greater than said vehicle width,
   extending means for moving said segments between said retracted and extended positions, and
   first and second stabilization fins movable between said retracted position and said extended position by said extending means, said first and second linear hydrophone array segments being installed on said first and second stabilization fins, respectively.

2. The array of claim 1 further including a third linear hydrophone array segment fixed in said vehicle for sonar operation when said first and second linear hydrophone array segments are in said retracted position and disposed between said first and second linear hydrophone array segments when in said extended position so as to form said extended array.

3. The array of claim 1 wherein said first and second stabilization fins have trailing edges,
   further including vehicle attitude control surfaces positioned at said trailing edges of said first and second stabilization fins.

4. The array of claim 1 further including actuator means for rotatably positioning said first and second stabilization fins when in said extended position so as to effect attitude control of said vehicle.

5. The array of claim 1 wherein said extending means includes pivoting means fixed in said vehicle and to the ends of said first and second stabilization fins for pivoting said stabilization fins between said extended position projecting transversely from the longitudinal axis of said vehicle and said retracted position parallel to said longitudinal axis.

6. The array of claim 5 further including first and second stow channels within said vehicle and parallel to said longitudinal axis for stowing said first and second stabilization fins when in said retracted position.

7. The array of claim 1 wherein said first and second stabilization fins have leading edges, said first and second linear hydrophone array segments being installed at said leading edges of said first and second stabilization fins, respectively.

* * * * *